June 18, 1963  S. M. LIDELL  3,094,401
ETHANE SIDE STRIPPER
Filed April 19, 1960
FIG. 1.
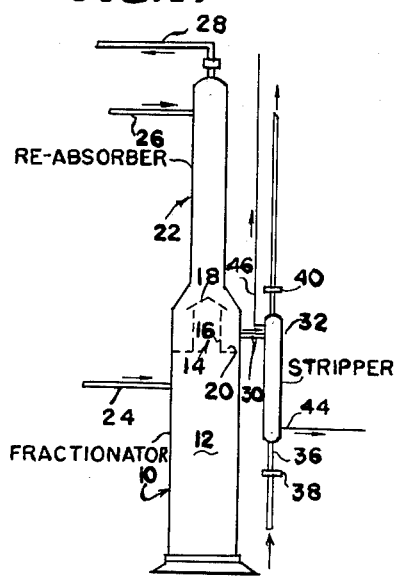
FIG. 2.
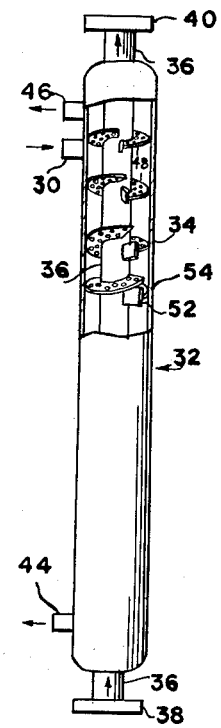
FIG. 3.
FIG. 4.
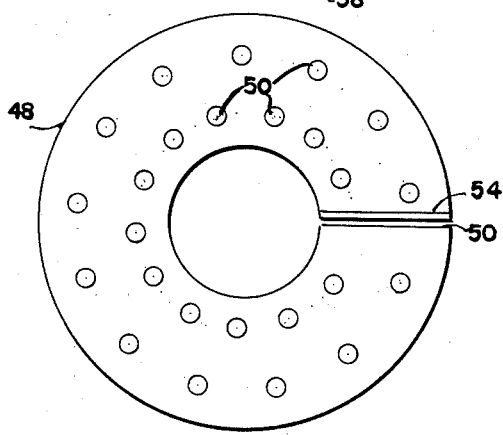
INVENTOR
SWANTE M. LIDELL
BY Cushman, Darby & Cushman
ATTORNEYS United States Patent Office 3,094,401
Patented June 18, 1963

3,094,401
ETHANE SIDE STRIPPER
Swante Max Lidell, Rte. 1, Box 198A, Houston, Tex.
Filed Apr. 19, 1960, Ser. No. 23,238
4 Claims. (Cl. 55—206)

This invention relates to apparatus for the fractional separation of relatively high boiling liquids from mixtures thereof with relatively low boiling liquids or absorbed gases.

More particularly, this invention is directed to an improved design for apparatus useful for the separation of methane and ethane from higher hydrocarbon components such as propanes, butanes, pentanes, and heavier components, which may be condensed, from natural gas sources.

Most natural gas produced is composed of a wide range of hydrocarbons, and will typically contain both the "non-condensable" gases of methane and ethane and the "condensable" components of propanes, butanes, pentanes, and heavier components. These condensable components constitute sources of trouble, and create difficulties, in long distance gas transmission, and, consequently, it is important that they be removed from the methane/ethane components.

It has been the custom, however, in the gas-producing industry to construct rather large and expensive plants for the extraction of the condensable components only at junctions of gathering systems, or branch lines, from a number of gas-producing sites. Since one of the condensable components, pentane, can be sold as a straight run motor fuel, these large installations have been known as "gasoline plants." This approach has been necessary from a practical economical point of view because the capital expense of conventional plants is such that no single field, and particularly not the comparatively low-production fields, could support these extractions facilities. For instance, conventional extraction facilities of this sort may cost hundreds of thousands of dollars. At the same time, the condensable components, if extracted, are readily marketable in the gas-producing areas.

It has thereby been understandably desirable to develop a plant which would satisfactorily extract the condensable components from the methane/ethane in an economical manner when operated with relatively low volume inputs. Clearly, a plant of less expense, smaller size, and greater efficiency is needed to accomplish this objective.

The present invention is directed to a fractionating system which is particularly adapted for use in such extraction facilities, although its advantages may also be realized in the operation of typical "gasoline plants."

In the extraction method for the removal of the higher condensable hydrocarbon fractions of natural gas, an absorption stage is typically employed wherein such higher components, and some of the methane and ethane, are absorbed into an absorbing oil. This oil, which is then rich in all of the absorbed gases, and particularly the ethane gas, is introduced into a fractionating unit known as a de-ethanizer. The de-ethanizer comprises a tower which includes a lower main fractionating section and an upper reabsorber section. Interposed these sections is a "stack" unit and a liquid trap to prevent return of condensed liquids to the main fractionating section from the re-absorber section.

In the present invention, a highly advantageously designed "ethane side stripper" is provided for operation in conjunction with the de-ethanizer, particularly with respect to the liquids collected in the aforesaid trap. This invention also provides an improved tray design for use in the said ethane side stripper.

It will, therefore, be understood that it is an object of this invention to provide an improved combination of a de-ethanizer and an ethane side stripper. It is a further object of this invention to provide a highly advantageous ethane side stripper unit. Still another object of this invention is to provide an improved tray structure and arrangement particularly adapted for use in the aforesaid ethane side stripper.

More particularly, it is an object of this invention to provide an ethane side stripper having fractionating trays of novel and advantageous design and arranged in a novel and particular array therein.

In order that it may be more fully understood, this invention will be described with reference to the accompanying drawing, wherein:

FIGURE 1 illustrates schematically a de-ethanizer and an ethane side stripper associated therewith;

FIGURE 2 illustrates schematically in perspective view cut away an ethane side stripper according to this invention; and FIGURES 3 and 4 illustrate respectively in plane and perspective view the fractionating tray provided by this invention.

Referring first to FIGURE 1, de-ethanizer 10 comprises a lower fractionating section 12; a stack 14, composed in turn of a flue element 16 and cover shield 18; a liquid trap 20 and a re-absorber section 22. The fractionating section 12 is provided with a rich oil inlet pipe 24 and the re-absorber section 22 is provided with a lean oil feed pipe 26 and a gas outlet conduit 28. These units are, of course, provided with suitable means for maintaining the same at the desired temperatures, as will be readily understood by those skilled in the art.

In operation, rich oil obtained from a preceding absorber unit is introduced into fractionating section 12 through pipe 24, and vaporized fractions flow upward through the "stack" and flue 14 into the re-absorber section. At the same time, lean oil, at a temperature of, say, 30 to 50° F., is fed into the upper re-absorber section through pipe 26. The lean oil is then brought into contact with the vapor moving upwards from the fractionation section and will dominantly absorb, for later recovery, the propane and heavier condensable fractions which have entered this upper section with the ethane, as vapor.

This lean oil, now "rich" from the condensable fractions, together with significant amounts of ethane absorbed therein, collects in liquid trap 20 which is generally circumferentially disposed about flue element 14. Since the lean oil enters the re-absorber column at a comparatively lower temperature, it will now have, as "absorbed rich" oil in the liquid trap, a temperature of only about 100° F.

From this liquid trap, the absorbed rich oil is delivered through conduit 30 to the ethane side stripper column generally shown as 32.

Referring now to FIGURE 2, ethane side stripper column 32 comprises a cylindrical wall element 34 concentrically arranged about a central hot oil pipe 36 having inlet 38 and outlet 40. Pipe 36, which extends throughout the length of the side stripper column, as shown, permits the flow of hot heating oil therethrough to maintain the temperature of the stripper column at the desired level. More particularly, this hot oil pipe is arranged cooperatively with the fractionating trays so as to provide an especially advantageous heating arrangement.

The side stripper column is also provided with a rich oil inlet 30, an outlet 44 for the rich oil now stripped of its ethane content, and ethane vapor outlet 46. Arranged internally of the side stripper column are a plurality of trays 48 having the structure shown in FIGURES 3 and 4.

As can be seen from FIGURES 3 and 4, trays 48 have a generally helical configuration and are composed of a split annular flat "washer-like" ring. The configuration is not unlike a conventional lock washer in many respects. The tray is perforated with a plurality of holes 50, which permit, in operation, the upward flow of vapors. The lowermost of the two radial edges 50 and 52 is also provided with weir 54 and downcomer plate 56, which may be an integral element. The weir 54 permits some hold-up of the down-flowing rich oil at each tray level, and retards the flow velocity of the liquid. Therefore, most of the vapors must travel upward through the tray perforations.

As shown in FIGURE 2, the trays are arranged in the ethane side stripper columns so that their inner circumference is contiguous with the hot oil pipe, and their outer circumference is contiguous, except for the split radial edges, with the column jacket itself. Furthermore, the trays are so arranged that the weirs and downcomers are axially staggered with respect to each other. The tray perforations are also staggered, the result being that a spiral downward flow of liquid is created, while a somewhat turbulent upward flow of gases and vapors, dominantly through the tray perforations, is maintained.

Thus, the rich oil is introduced through pipe 30 and flows spirally downward over the entire surface of successively arranged trays, overflowing the weir of each in its downward path, and is heated by the transfer of heat from the hot oil path 36. Since the trays are contiguous with the hot oil pipe, the trays are directly heated thereby. The vaporization of ethane from the rich oil may then be accurately controlled by the temperature and flow volume of the hot oil. As a result of this heating of the rich oil, ethane is vaporized and flows upward. Because of the restricted upward flow path for the ethane vapors, particularly those portions vaporized at the lower trays, highly efficient stripping, or fractionation, is obtained. That is, at upper tray levels, the gases are composed of methane and ethane; but to the extent that propanes, butanes, and, perhaps, pentanes are vaporized from some lower trays, they are re-absorbed during the contact of the vapors during their upward flow with the liquid film disposed completely over the entire surface of the trays. The liquid travel over the entire surface of the helical trays of this invention insures, at the same time, that the completely efficient ethane stripping is obtained. This efficiency is perhaps best illustrated by the observed fact that with the side stripper arranged according to the present invention, the number of trays required is very close to that indicated by theoretical calculation instead of some two to three times that many as has been commonly observed in practical experiences.

In typical operation, the ethane side stripper will be operated at about 350 pounds per square inch gauge, and this may be conveniently controlled to vary, as desired, between, for instance, about 300 to 400 pounds per square inch gauge. These are the pressure ranges which normally would be used with most natural gas supplies. The normal temperature to be maintained in the stripper will be about 200° F., although, as desired, this may be varied to suit special process conditions between about 190 and 225° F. The oil in the hot oil pipe 36 can be maintained as high as 350° F., but is normally controlled to that temperature required, according to the design and behavior of the particular unit concerned, to maintain the desired operating temperature, for instance, the normal temperature of about 200° F.

Normally, the ethane side stripper has been found to operate entirely satisfactory and highly efficiently with from 8 to 10 trays disposed therein for a column having an internal diameter of 8 inches and an overall length, from pipe 44 to pipe 46, of 120 inches. With a unit of this size, 600 gallons per hr. of rich oil, having an ethane content of about 15%, and a condensable hydrocarbon content of about 85%, per hour, with a recovery of 98% of the total ethane content, substantially entirely free of propanes and heavier condensable components. In this unit, the external diameter of hot oil pipe 36 was 2 inches and the pitch of each tray was about 8°.

It will be understood that this invention is not limited to the specific structure, and certainly not to the dimensions just stated, for the apparatus herein disclosed. Neither is it limited to treatment of natural gas sources for ethane stripping but may also be used for analogous fractionation separations. Modifications according to particular processing conditions as desired by the operator, may therefore be made in the specific apparatus without departing from the spirit and scope of this invention which is limited only by the following claims.

What is claimed is:

1. Apparatus for separation of vapors from liquids which comprises in combination: wall means defining a closed column, conduit means permitting flow of heat exchange fluid concentrically through said column; means permitting introduction of a vapor liquid mixture into said column; means permitting removal of separated mixture components from said column; conduit means permitting removal of separated vapor components from said column; and a plurality of spaced fractionating tray means each having inner and outer circumferential edges substantially contiguous with said conduit means and said wall means respectively said tray means being in heat conductive contact with said conduit means; each of said fractionating tray means comprising a centrally apertured disk, said disk being radially split and helically twisted so as to provide spaced radial edges thereon, the lowermost of said radial edges being provided with weir means extending above the upper surface adjacent said lowermost radial edge; and with downcomer means extending below the lower surface adjacent said lowermost radial edge; said disk being further provided with a plurality of perforations permitting vapor flow therethrough.

2. The apparatus of claim 1, wherein said fractionating tray means are axially staggered with respect to each other so that said weir and downcomer means on adjacent trays are radially spaced from each other.

3. The apparatus of claim 1, wherein said conduit means are adapted for permitting upward flow of heat exchange fluid.

4. The apparatus of claim 1, wherein means permitting introduction of a vapor liquid mixture are generally disposed at the top of the column, said means permitting removal of separated vapor components disposed above said first-mentioned means, and said means permitting removel of separated liquid components are generally disposed adjacent the bottom of the column.

References Cited in the file of this patent

UNITED STATES PATENTS

| 453,005 | Holden | May 26, 1891 |
| 865,980 | Garland | Sept. 10, 1907 |
| 1,804,554 | Dubbs | May 12, 1931 |
| 2,310,829 | Becker | Feb. 9, 1943 |
| 2,815,650 | McIntire et al. | Dec. 10, 1957 |
| 2,826,266 | Hachmuth | Mar. 11, 1958 |
| 2,944,966 | Eickmeyer | July 12, 1960 |

FOREIGN PATENTS

| 608,620 | France | Apr. 24, 1926 |
| 655,087 | Germany | Jan. 8, 1938 |